Figure 6:
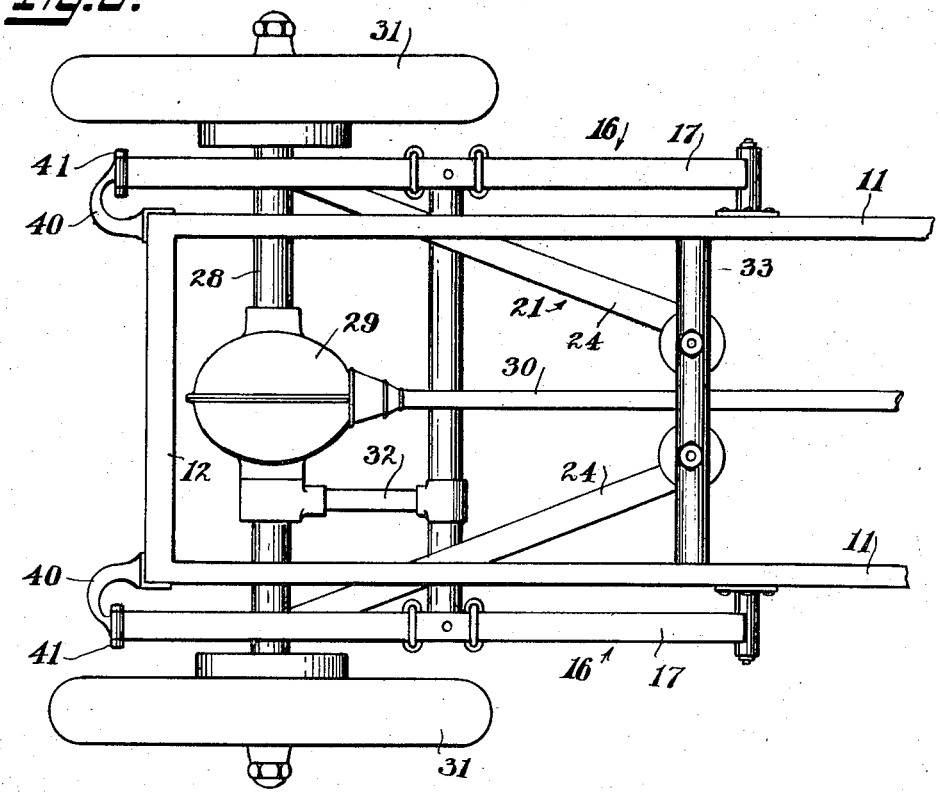

E. KOEB & R. P. THOMPSON.
VEHICLE SPRING.
APPLICATION FILED DEC. 31, 1914.
1,156,909.
Patented Oct. 19, 1915.
3 SHEETS—SHEET 1.
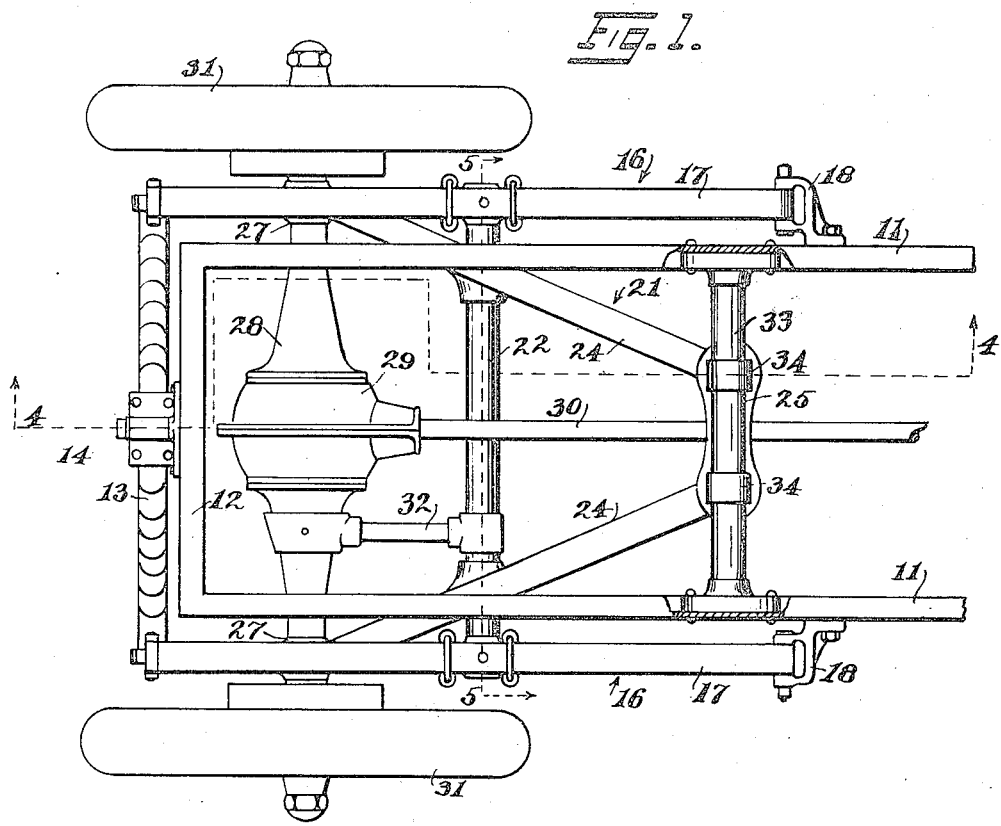
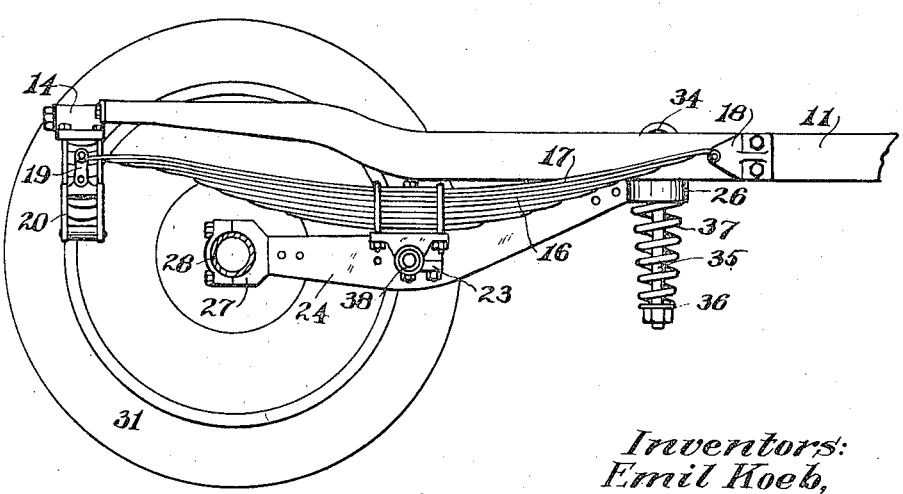
Witnesses:
Charles Horton
H. D. Penney
Inventors:
Emil Koeb,
Ralph Pearson Thompson,
By their Atty, F. H. Richards E. KOEB & R. P. THOMPSON.
VEHICLE SPRING.
APPLICATION FILED DEC. 31, 1914.
1,156,909.
Patented Oct. 19, 1915.
3 SHEETS—SHEET 2.
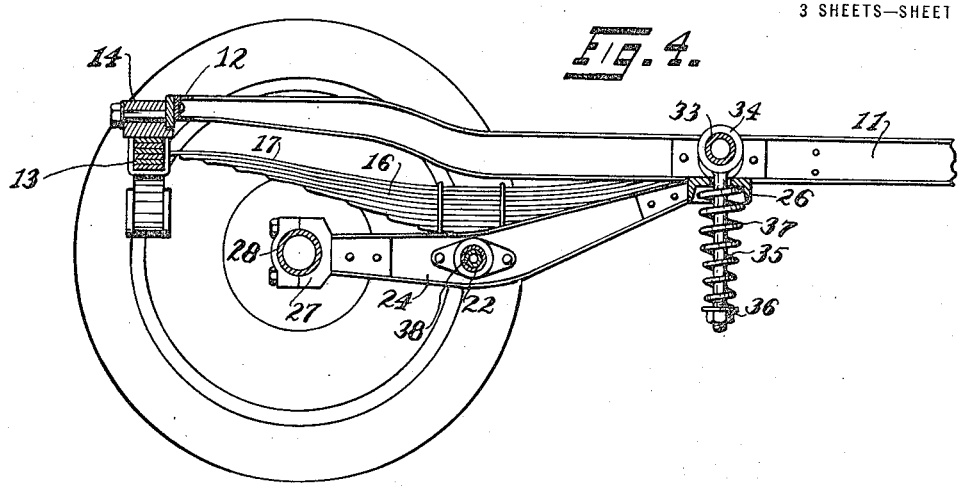
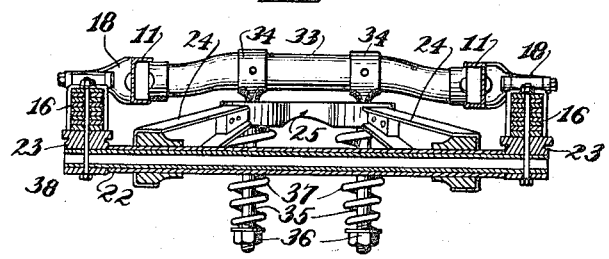
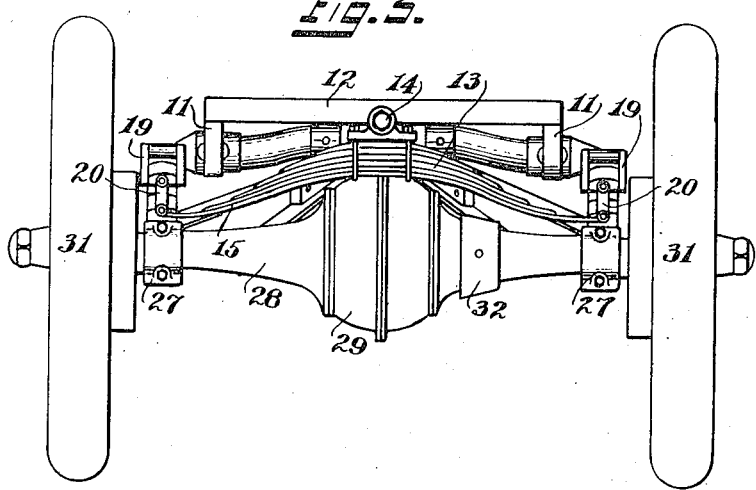
Witnesses:
Charles Horton
H. D. Penney
Inventors:
Emil Koeb,
Ralph Pearson Thompson,
By their Atty, F. W. Richards.

E. KOEB & R. P. THOMPSON.
VEHICLE SPRING.
APPLICATION FILED DEC. 31, 1914.

1,156,909.

Patented Oct. 19, 1915.
3 SHEETS—SHEET 3.

Witnesses:

Inventors:
Emil Koeb,
Ralph Pearson Thompson,
By their Atty, ns
UNITED STATES PATENT OFFICE.

EMIL KOEB, OF NEW YORK, N. Y., AND RALPH PEARSON THOMPSON, OF LEIPSIC, OHIO.

VEHICLE-SPRING.

1,156,909.

Specification of Letters Patent.

Patented Oct. 19, 1915.

Application filed December 31, 1914. Serial No. 879,850.

*To all whom it may concern:*

Be it known that we, EMIL KOEB, a citizen of the United States, residing at New York, in the county of New York and State of New York, and RALPH PEARSON THOMPSON, a citizen of the United States, residing at Leipsic, in the county of Putnam and State of Ohio, have invented certain new and useful Improvements in Vehicle-Springs, of which the following is a specification.

This invention relates to vehicle frames and to spring supporting means therefor, and is particularly adapted for automobiles although in no sense confined thereto.

The object of the invention is the production of a construction which, while possessing the elements of strength, durability, and reasonable cost, shall to a large extent relieve the vehicle to which it is applied from strain due to irregularities in the road, unbalanced loading, and the taking of curves, and which shall add to the ease and safety of riding.

The invention aims at the production of a construction which shall absorb and relieve the vehicle body from shock and at the same time prevent the vehicle body from tilting due to being more heavily loaded on one side than the other, and from swaying due to any cause whatsoever.

Broadly, the invention comprises a rigid frame which carries main supporting springs for the vehicle body and which is provided with lighter compensating springs. While the springs coöperate with one another, the larger springs for the most part sustain the weight of the vehicle body and absorb the greater shocks to which the vehicle is subjected; and the lighter or compensating springs for the most part absorb the smaller shocks. The frame, although flexibly connected with the vehicle body, because of its rigidity and the supporting of the main springs thereon, provides for a practically uniform flexing of these springs, thereby preventing tilting and swaying of the vehicle body.

For more specific presentation of the invention, we have illustrated an embodiment thereof in the drawings which form a part of this application and in which—

Figure 7:
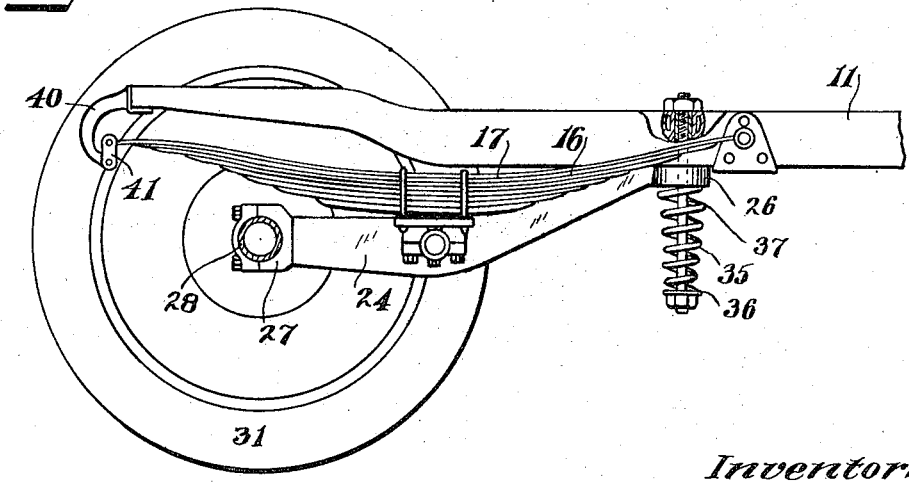

Figure 1 is a fragmental plan of an automobile chassis to which our invention is applied. Fig. 2 is a side elevation of the same with the wheel of the near side removed. Fig. 3 is a rear elevation of the same. Fig. 4 is a longitudinal section taken on the line 4—4 of Fig. 1. Fig. 5 is a transverse section taken on the line 5—5 of Fig. 1. Fig. 6 is a similar view to Fig. 1 showing a modification of the construction there illustrated. Fig. 7 is a similar view to Fig. 2 showing the construction of Fig. 7.

Considering first Figs. 1 to 5 inclusive, the chassis of the automobile comprises two side rails 11, 11 connected at the rear by a cross rail 12. A back leaf spring 13 is centrally pivoted at its upper middle portion to the cross rail 12 by a bearing 14, and has its concave side facing downward. Two main supporting springs 16, 16, one on each side of the chassis, are connected on their rear ends with the back spring 13 at the ends thereof by universal joints comprising the members 19, 19 and 20, 20. The forward ends of the main supporting springs are pivotally connected with the side rails of the chassis by bearings 18, 18. These springs have their concave sides facing upward. They are supported, by means of brackets 23, 23 at their middle points by a rigid A shaped frame 21, comprising two side members 24, 24 rigidly joined at the front by a connecting bar 25, and intermediate of their length by a cross arm illustrated as comprising an outer tube 22 and an inner tube 38. The outer tube abuts against the brackets 23, 23 and the inner tube extends through these brackets and is rigidly connected thereto, and to the main supporting springs 16, 16. The relative size of the two tubes is such that while the inner tube can turn readily in the outer tube no unnecessary play is allowed between them. The rear ends of the A frame are provided with clamps 27, 27 and rigidly support the differential and rear shaft casing 28 with its inclosed mechanism for supporting and driving the rear wheels 31, 31. Additional means can be provided for preventing this casing from turning if desired, such, for example, as a torsion rod 32 which is rigidly fastened to the casing on the one end and to the cross arm of the A frame on the other. The purpose of this rigid connection is to relieve an unprotected driving shaft, illustrated as shaft 30, of bending strains and friction from the differential and rear shaft casing 28. Obviously where the driving shaft is protected by a casing rigidly connected with the differential casing, such means need not be employed. The A frame is supported at its forward end by two helical compensating springs 37, 37, the forward bar 25 of the frame being provided with sockets 26, 26 to receive the upper ends of the springs. These springs, by means of collars 34, 34, rods 35, 35, and stops 36, 36, are centrally hung on a cross arm 33 which is rigidly fastened to the side rails 11, 11 of the chassis, and the collars are rigidly fastened thereto.

The operation of this form of the invention may be illustrated as follows: Considering first irregularities of the road: Assume that both rear wheels in passing over an obstruction or gutter are given a uniform and co-temporaneous thrust upward; the A frame will pivot about its cross arm as a fulcrum, the outer tube 22 thereof turning on the inner tube 38, both compensating springs 37, 37 will be compressed and if the upward thrust of the wheels is not too powerful, will absorb the greater part of the shock. The main supporting springs will receive a slight upward blow. The compression of the compensating springs exerts a downward pull on the chassis; the effort of the main supporting springs on the chassis is upward. These two forces neutralize each other and the chassis remains unmoved. Where such a thrust on the wheels is great, the main supporting springs together with the rear springs will be flexed, but the neutralizing effect will still be present. Assume now that one of the rear wheels by reason of an obstruction or gutter is thrust upward above the other wheel, the same pivoting of the A frame and neutralizing effect as above described takes place. But now the A frame in addition pivots laterally on the bearing 14 at the rear, and on the compensating springs at the front. The thrust on the chassis is along its central longitudinal line and no tilting or jolting thereof occurs. Considering the swaying or tilting of the vehicle body from a cause residing in or due to the vehicle body itself, assume, for example, that the vehicle is more heavily loaded on one side than the other; a greater downward pressure is then exerted on one of the main supporting springs than on the other. But these springs are rigidly connected together by the rigid A frame, and the whole tendency of the compensating springs is to prevent any lateral pivoting movement of this frame in respect to the chassis. Consequetly both of the main supporting springs will be equally flexed and the vehicle body will remain level.

The construction shown in Figs. 6 and 7 follows the construction above described very generally, as is seen by the similarity of the drawings and reference numerals. The rear spring 13 of the construction shown in Figs. 1 to 5 inclusive is omitted. Instead of these, two downwardly inclined arms 40, 40, are attached at the rear of the chassis side rails 11, 11, and the rear ends of the main supporting springs 16, 16 are pivotally connected thereto as indicated at 41, 41. Furthermore this form does not necessitate the double tube construction of the cross arm of the A frame, for with the back spring 13 omitted, the brackets 23, 23 may have a relative turning movement on the cross arm. This turning movement compensates for the pivot movement of the rear spring 13 of the first form; so that the operation of the second form is substantially like that of the first.

The foregoing detail description has been given for clearness of understanding and no undue limitations should be deducted therefrom, but the approved claims should be construed as broadly as permissible in view of the prior art.

What we claim as new and desire to secure by Letters Patent of the United States, is—

1. In a vehicle, the combination of a main frame having two side rails, a supplemental frame, a cross rod secured between said side rails at the intermediate portion of the vehicle, coil springs resiliently connecting the front end of said supplemental frame with said cross rod, the supplemental frame having ground wheels carried thereby at the rear end, a cross member at the intermediate part of the supplemental frame, and a pair of spring members one connected at its middle portion to each end of said cross member, said pair of spring members having their end portions secured to the main frame.

2. In a vehicle, the combination of a main frame having two side rails, a supplemental frame, a cross rod secured between said side rails at the intermediate portion of the vehicle, coil springs resiliently connecting the front end of said supplemental frame with said cross rod, the supplemental frame having ground wheels carried thereby at the rear end, a tubular cross member at the intermediate part of the supplemental frame, a second cross rod extending through said tubular member, and a pair of spring members one connected at its middle portion to each end of said second cross rod, said pair of spring members having their end portions secured to the main frame.

3. In a vehicle, the combination of a main frame having two side rails and a rear rail connecting the two side rails with one another, a cross rod secured between said side rails at the intermediate part of the vehicle, a supplemental frame, coil springs resiliently connecting the front end of said supplemental frame with said cross rod, the supplemental frame having ground wheels carried thereby at the rear end, a cross member at the intermediate part of the supplemental frame, a pair of spring members one connected at its middle portion to each end of said cross member, and a rear spring member connected at its middle portion to the middle portion of said rear rail, said side spring members each being connected at one of its ends to a side rail and at its other end to one of the ends of said rear spring member.

4. In a vehicle, the combination of a main frame having two side rails, a supplemental frame, a cross rod secured between said side rails at the intermediate portion of the vehicle, pins extending downwardly from said cross rod, the front end of the supplemental frame being slidably mounted on the pins and securely anchored thereby, spring seats at the lower ends of the pins, coil springs mounted between the spring seats and the front-end of said supplemental frame to normally maintain the front end in raised position and to absorb the lighter shocks, the supplemental frame having ground wheels carried thereby at the rear end, a cross member at the intermediate part of the supplemental frame, and a pair of spring members one connected at its middle portion to each end of said cross member, said pair of spring members having their end portions secured to the main frame.

5. In a vehicle, the combination of a main frame having two side rails, a supplemental frame, a cross rod secured between said side rails at the intermediate portion of the vehicle, spring means resiliently connecting the front end of said supplemental frame with said cross rod, a shaft casing secured to the rear end portion of said supplemental frame, a tubular cross member at the intermediate part of the supplemental frame, a second cross rod extending through said tubular member, a pair of spring members one connected at its middle portion to each end of said second cross rod, said pair of springs having their end portions secured to the main frame, and a torsion rod for connecting the shaft casing with said tubular cross member to safeguard the shaft casing against twisting, the torsion rod being fixedly secured to the shaft casing and the tubular cross member.

6. In a vehicle, the combination with a main frame having two side rails, a supplemental frame, an intermediate tubular cross member on the supplemental frame, a cross rod extending through the tubular member and connected with the main frame, a second cross rod secured between the side rails, pins extending downwardly from the second cross rod, said supplemental frame having two diverging rails approaching one another at their front ends, a bracket connecting the front ends of the rails, cup-shaped members formed in said bracket and facing downwardly, there being central openings through the cup-shaped members through which the pins pass to slidably mount the front ends of the diverging rails, spring-seats at the lower ends of the pins, coil springs mounted between the spring-seats and the cup-shaped members to absorb light shocks, and a shaft-casing secured to the rear end portion of said supplemental frame.

EMIL KOEB.
RALPH PEARSON THOMPSON.

Witnesses:
 EDWARD SCHAFER,
 A. STECHSCHULTZ.